US006927681B2

(12) United States Patent
Yoshino et al.

(10) Patent No.: US 6,927,681 B2
(45) Date of Patent: Aug. 9, 2005

(54) MIXED AIR AMOUNT ALARM DEVICE

(75) Inventors: Masato Yoshino, Asahi-machi (JP); Keita Nakano, Asahi-machi (JP)

(73) Assignee: Advics Co., Ltd., Aichi (JP)

( * ) Notice: Subject to any disclaimer, the term of this patent is extended or adjusted under 35 U.S.C. 154(b) by 21 days.

(21) Appl. No.: 10/701,460

(22) Filed: Nov. 6, 2003

(65) Prior Publication Data
US 2004/0090347 A1 May 13, 2004

(30) Foreign Application Priority Data

Nov. 6, 2002 (JP) ........................................ 2002-322288

(51) Int. Cl.[7] ............................ B60T 13/12; B60Q 1/00
(52) U.S. Cl. .................... 340/452; 340/450.1; 340/453; 340/618; 303/191; 303/122.1; 73/168
(58) Field of Search ............................ 303/122–122.15, 303/113.1, 191; 340/450.1–453, 449, 632, 603, 618; 188/151 R, 353; 73/168, 121; 92/5 R; 91/376 R

(56) References Cited

U.S. PATENT DOCUMENTS

| 3,497,034 A | * | 2/1970 | Eddy, Jr. ..................... 184/109 |
| 4,345,672 A | * | 8/1982 | Nakasu .................. 188/1.11 R |
| 6,729,698 B2 | * | 5/2004 | Kusano et al. .............. 303/191 |
| 2003/0090149 A1 | | 5/2003 | Kusano et al. |
| 2003/0192376 A1 | | 10/2003 | Nakano |

FOREIGN PATENT DOCUMENTS

| DE | 101 47 181 A | 12/2002 |
| DE | 102 49 881 A1 | 6/2003 |
| JP | 2003-301809 A | 10/2003 |

* cited by examiner

Primary Examiner—Jeffery Hofsass
Assistant Examiner—Anne V. Lai
(74) Attorney, Agent, or Firm—Burns, Doane, Swecker & Mathis, LLP

(57) ABSTRACT

A mixed air amount alarm device is provided which determines the amount of air present in a hydraulic circuit between a hydraulic pressure source and an instrument driven by hydraulic pressure, and produces an alarm if the air amount is excessive, a situation is prevented in which an alarm is produced or not produced according to change of the air amount (volume) resulting from temperature change, and it is possible to stop an alarm if potential danger disappears and a safe state is recovered due to spontaneous release of air out of the hydraulic circuit. If the air amount is determined excessive, this is stored in a nonvolatile memory, and even if air amount excessiveness determination is not made at the next activation of the hydraulic device, the content of the nonvolatile memory is checked and an alarm is produced if air amount excessiveness determination has not been made before. It is preferable to add a function of erasing the air amount excessiveness determination history when specific conditions are met, for example, if the fluid temperature of hydraulic fluid or its inferred value is equal to or higher than a predetermined value, and in this state, the air amount is determined to be at a permissible level.

16 Claims, 4 Drawing Sheets

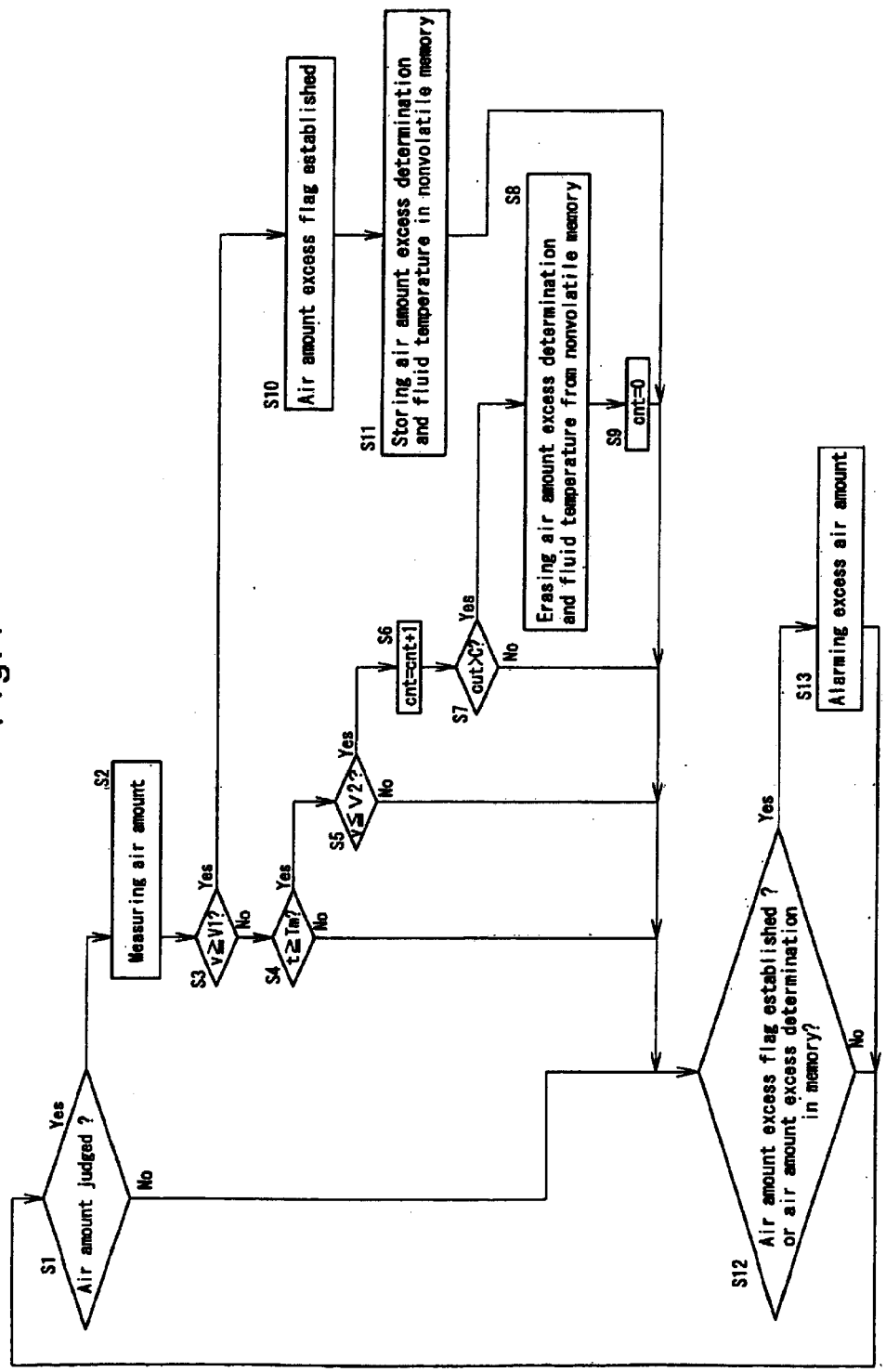

MIXED AIR AMOUNT ALARM DEVICE

BACKGROUND OF THE INVENTION

This invention relates to a device for determining the amount of air mixed into a hydraulic circuit of a hydraulic device such as a vehicle hydraulic brake device and producing an alarm if necessary. More specifically, it relates to a mixed air amount alarm device which can prevent an alarm from being cancelled when an alarm should be produced, due to fluctuation in the air amount (volume) resulting from temperature change, and which also can stop a warning when it returned to a safe state due to spontaneous discharge of air out of the hydraulic circuit.

The present applicant proposed in JP patent application 2002-108160 a soundness evaluation method for a hydraulic pressure control unit which makes it possible to determine the air amount in a hydraulic circuit (piping) provided in a hydraulic device such as a hydraulic brake device, and to produce an alarm if the air amount is determined to be excessive.

With this soundness evaluation method, a first pressure detecting means is connected to piping connecting a hydraulic pressure control means to a hydraulic device to detect the hydraulic pressure in the piping with the first pressure detecting means, and further, a second pressure detecting means is connected to an accumulating means for accumulating hydraulic pressure generated by a hydraulic pressure generator to detect the hydraulic pressure in the accumulating means, and a control device for recognizing the detection signals from the first and second pressure detecting means determines a stationary state when the absolute value of pressure gradient of the accumulating means per unit time when the hydraulic pressure control means outputs hydraulic pressure becomes equal to or lower than a predetermined amount.

The decreased amount (i.e. discharge amount) of hydraulic pressure of the accumulating means from the time before the hydraulic pressure control means is activated until the abovementioned normal state, and the hydraulic pressure in the piping at the stationary state are determined, and they are compared with the values in the normal state during which no air is mixed in the piping. If the amount of air in the piping increases, the relation between the amount of fluid QW discharged from the accumulator and the output hydraulic pressure PW differs from the relation in the normal state. Thus, it is possible to judge the amount of air in the piping from how the relation between the fluid amount QW and the hydraulic pressure PW measured in the stationary state shifts from the relation in the normal state and produce an alarm when a shift occurs that exceeds a preset value.

The amount of air in the hydraulic circuit is the volume of air. The volume of a gas varies with the temperature even though the mole amount is constant (Boyle-Charles' law).

Thus, in the above soundness evaluation method, if the fluid temperature rises, since the volume of air expands, it is determined that the air amount is excessive. But when the fluid temperature lowers, the air amount is not determined to be excessive. Thus, confusion occurs because an alarm is sometimes given and sometimes not given. Besides, that an alarm is not produced in spite of the fact that it is known that when the fluid temperature rises, an alarm will be produced is a state in which is hidden danger in a vehicle brake device. This is not preferable. In other words, producing an alarm in this state is not a false alarm, but can be said to be a desirable measure.

One object of this invention is to eliminate these disadvantages, and not to cancel an alarm if the air amount is determined to be excessive in a state of expanded air due to temperature rise and thereafter the determination of excessive air amount is not met due to cooling.

A second object of this invention is to make it possible to stop an alarm if air amount in the hydraulic circuit has decreased due to spontaneous release, and as a result, a safe state is recovered in which no air amount excessiveness occurs even if the fluid temperature becomes high.

SUMMARY OF THE INVENTION

In order to solve this object, according to this invention, the following functions are added to a device for determining the air amount present in a hydraulic circuit between a hydraulic pressure source and an instrument driven by hydraulic pressure and producing an alarm if the air amount is determined excessive.

That is to say, if the air amount is determined excessive, this is stored in the nonvolatile memory, and the content of the nonvolatile memory is checked at subsequent activation of the hydraulic device, even if determination of air amount excessiveness is not made and an alarm is produced if determination of air amount excessiveness has been made before.

The mixed air amount alarm device may further comprise a fluid temperature meter for measuring the temperature of hydraulic fluid, or means for measuring the temperature of a portion suitable to infer the temperature of the hydraulic fluid, and a program for inferring the temperature of the hydraulic fluid from the temperature measured by the temperature measuring means, wherein only if the air amount is determined excessive in a high temperature state in which the temperature of the hydraulic fluid or the inferred temperature is equal to or higher than a predetermined value, storage in the nonvolatile memory is carried out, or if the air amount is determined to be at a permissible level in a high temperature state in which the temperature of the hydraulic fluid or the inferred temperature is equal to or higher than a predetermined value, the air amount excessiveness determination history in the nonvolatile memory is erased.

Also, in another embodiment, the fluid temperature of the hydraulic fluid or the inferred value of the fluid temperature when air amount excessiveness determination is made, too, may be stored in the nonvolatile memory, and if the air amount is determined to be at a permissible level at subsequent activation of the hydraulic device with the fluid temperature or its inferred value at the time of activation being higher than the temperature of the hydraulic fluid or the inferred value of the fluid temperature when the previous air amount excessiveness determination is made, the air amount excessiveness determination history and the stored fluid temperature or inferred fluid temperature in the nonvolatile memory may be erased.

Further, it may be a device in which a reference air amount for determining an air amount permissible level is smaller than a reference air amount for determining air amount excessiveness, or a device in which after carrying out the determination of air amount permissible level at least several times, the nonvolatile memory is erased.

The mixed air amount alarm device used in a hydraulic circuit of this invention is especially advantageous if it is used in a vehicle hydraulic brake device for which high safety is required. But it can also be advantageously used for other hydraulic devices than brake devices (in which air is mixed and volume change due to temperature change of the mixed air can occur).

By providing the alarm device of this invention, if the air amount in the hydraulic circuit is determined excessive with the air expanded due to temperature rise, this fact is stored in the nonvolatile memory, and priority is given to the stored contents at the next and subsequent activation of the hydraulic device. Thus, even if the air amount is not determined excessive due to cooling, an alarm is not lifted.

Also, with the device in which the air amount excessiveness determination history stored in the nonvolatile memory is erased if specific conditions are met, it is possible to eliminate unnecessary alarms if the air amount in the hydraulic circuit decreases due to spontaneous release and a safe state is recovered in which no air amount excessiveness occurs even if the hydraulic fluid becomes hot.

BRIEF DESCRIPTION OF THE DRAWINGS

Other features and objects of the present invention will become apparent from the following description made with reference to the accompanying drawings, in which:

FIG. 4 is a flowchart of the operation of the mixed air amount alarm device of a second embodiment.

DETAILED DESCRIPTION OF THE PREFERRED EMBODIMENT

Hereinbelow, based on the attached figures, the embodiments of this invention will be described. Here, this invention is applied to vehicle hydraulic brake devices.

Figure 1:
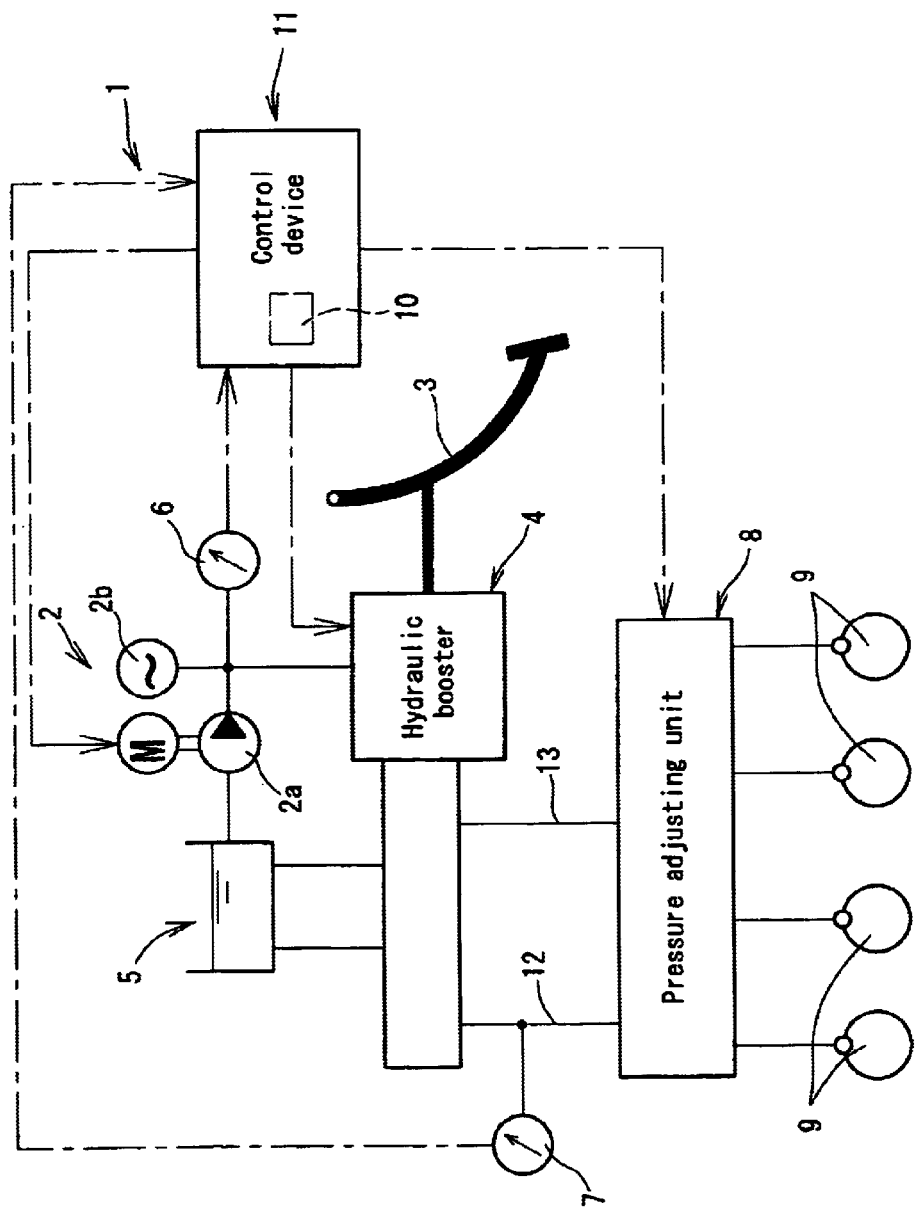
FIG. 1 is a view showing an example of a hydraulic brake device having a mixed air amount alarm device embodying this invention.

The hydraulic brake device 1 shown in FIG. 1 has a high pressure source 2, brake pedal 3, hydraulic booster 4, reservoir tank 5, pressure sensors 6 and 7, pressure adjusting unit 8, a plurality of wheel brakes 9, and a control device 11 including a mixed air amount alarm device 10 embodying this invention.

The high pressure source 2 has a power-driven pump 2a, and an accumulator 2b that accumulates the hydraulic pressure generated by the pump 2a.

The hydraulic booster 4 has a hydraulic pressure control valve (not shown) that adjusts the hydraulic pressure supplied from the high pressure source 2 to a value corresponding to the brake pedal stepping amount and outputs it to a hydraulic circuit 13, and a master cylinder (not shown) having a master cylinder piston operated under the hydraulic pressure adjusted by the hydraulic pressure control valve and supplying the generated hydraulic pressure to a hydraulic circuit 12 in a different line. By the amplifying function by the hydraulic booster 4, hydraulic pressure that has been amplified to a level corresponding to the stepping force applied to the brake pedal 3 or the pedal operating amount is fed to the hydraulic circuits 12, 13. The hydraulic booster 4 is connected to the reservoir tank 5, so that it also serves to return brake fluid from the wheel brakes 9 to the reservoir tank 5, or replenish brake fluid to the hydraulic circuit from the reservoir tank 5. Since the hydraulic booster 4 is shown in detail in JP patent publication 2002-264795, and its structure is not particularly limited, detailed description is omitted.

The pressure adjusting unit 8 increases, reduces and holds the fluid pressure to the wheel brakes 9 by opening and closing solenoid valves. The pressure adjusting unit 8 is activated in response to a command from the control device 11 to carry out hydraulic pressure control for behavior control of the vehicle such as antilock control (ABS). Since the pressure adjusting unit is well-known, detailed description-is omitted.

Figure 2:
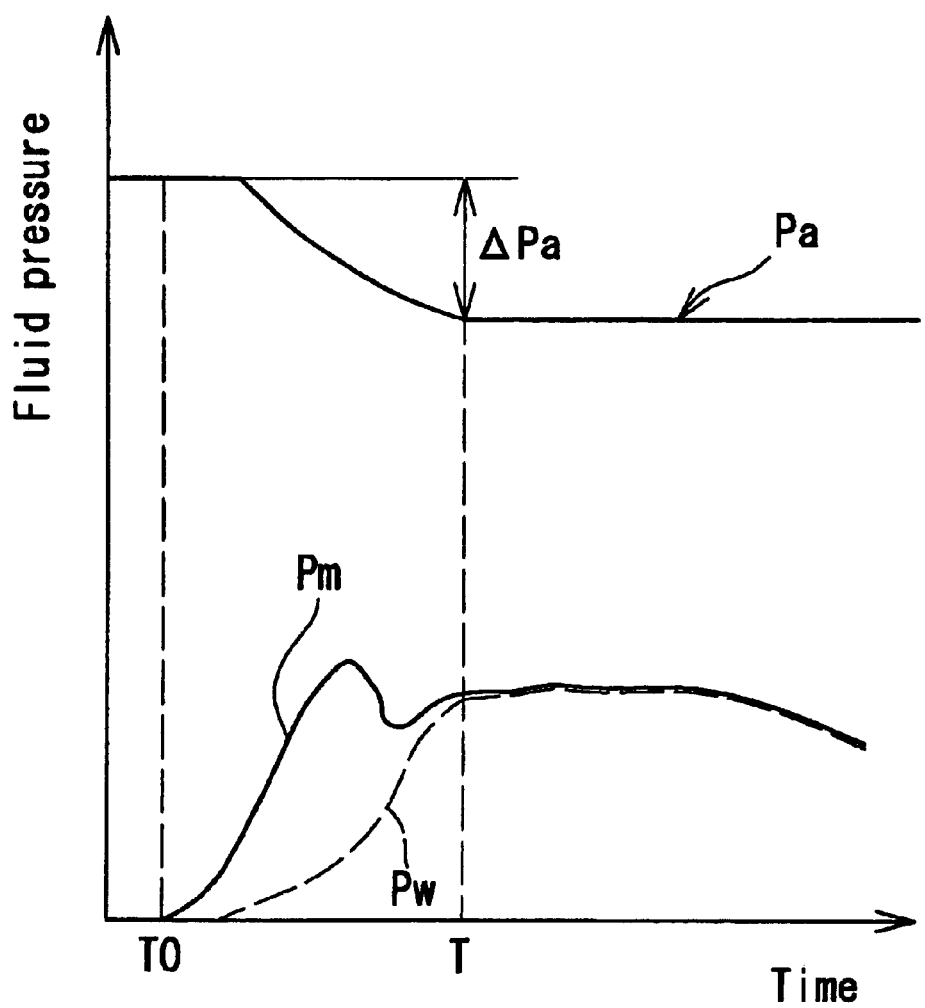
FIG. 2 is a graph showing how the fluid pressure Pa in the accumulator, output fluid pressure Pm from the hydraulic booster, and the fluid pressure Pw from the wheel brakes change.

In the hydraulic brake device 1 having such a structure, the pressure Pa in the accumulator 2b is detected by the pressure sensor 6. Also, hydraulic pressure Pm fed to the hydraulic circuit 12 (hydraulic pressure from the hydraulic booster 4) is detected by the pressure sensor 7. FIG. 2 shows an example of the behaviors of hydraulic pressures Pa, Pm and Pw when the brake pedal 3 has been stepped in. Since the driver steps in the brake pedal while controlling the braking force, the output hydraulic pressure Pm is often repeatedly increased and reduced as shown in FIG. 2 until it stabilizes at a predetermined hydraulic pressure. On the other hand, the hydraulic pressure PW of the wheel brakes 9 gradually rises, slightly behind the hydraulic pressure Pm, and stabilizes when it reaches substantially the same pressure as the hydraulic pressure Pm.

The control device 11 monitors a detection signal from the pressure sensor 6 to recognize the hydraulic pressure Pa in the accumulator 2b. It determines that it is a stationary time T when the gradient of change of the hydraulic pressure Pa per unit time becomes equal to or below a predetermined amount, e.g. 0.5 MPa/s (when it approaches zero). Since the gradient of change of the hydraulic pressure Pa per unit time at this time is negative, determination of the stationary time T is made taking the absolute component. As is seen from FIG. 2, the hydraulic pressure Pm at the thus determined stationary time T and the hydraulic pressure Pw in the wheel brakes 9 are substantially equal to each other and are also stable.

In the soundness evaluation method disclosed in JP patent application 2002-108160, the reduced amount (amount of change) $\Delta P$ of the hydraulic pressure in the accumulator 2b from before the activation of the hydraulic pressure control means to the stationary time T is determined and compared with data at a normal time. The fact that the hydraulic pressure reduced amount $\Delta P$ is larger than the value at the normal time means that the amount of fluid Qa supplied from the accumulator 2b to the hydraulic booster 4 is larger than the value at the normal value. On the other hand, that the fluid amount Qa becomes greater than the value at the normal time means that the air amount in the hydraulic circuit has increased, or fluid leak has occurred in the piping. Thus, with this soundness evaluation method, it is possible to know increase and decrease of the amount of air present in the brake hydraulic circuit (piping lines) and produce an alarm if increase in the air amount exceeds a preset value.

But in this method, as described earlier, the determination of excessiveness of the air amount may be influenced by the temperature, or may be overturned and disappear due to a temperature drop thereafter. In order to obviate this trouble, in the hydraulic brake device 1 of FIG. 1, there is provided a mixed air amount alarm device 10 having a nonvolatile memory, a fluid temperature meter for measuring the temperature of brake fluid or a means for measuring the temperature sufficient to infer the brake fluid temperature (ambient air temperature, suction air temperature, temperature of the battery fluid, temperature of the hydraulic pressure control device, etc.), and a program for inferring the brake fluid temperature based on data from such a measuring means.

Figure 3:
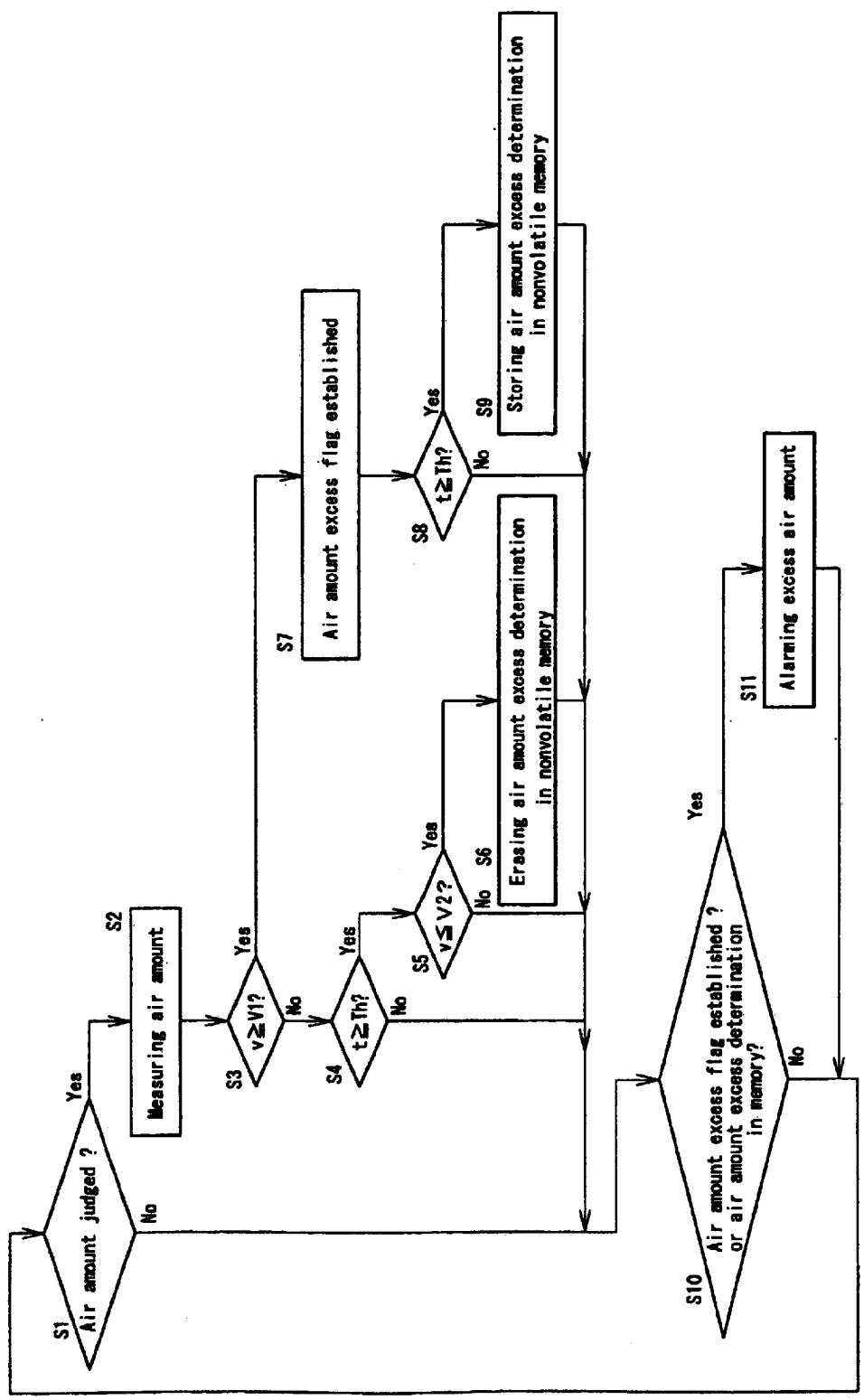
FIG. 3 is a flowchart of the operation of the mixed air amount alarm device of a first embodiment.

Next, the function of the first embodiment of the mixed air amount alarm device 10 will be described with reference to the flowchart of FIG. 3. The mixed air amount alarm device 10 starts activating when the ignition switch of the vehicle is turned on and executes the process according to the flowchart at predetermined time intervals.

First in step S1, it is determined whether or not the air amount measurement to be carried out when the brakes are operated is being executed. If the answer is NO, in step S10 the determination is made whether to give an alarm to a driver. On the other hand, if the answer is YES, it moves to step S2.

In step S2, the amount of air mixed in the brake hydraulic circuit is measured, and it moves to step S3.

In step S3, it is determined whether the measured air amount v is greater than the preset value for air amount excessiveness determination (reference value) V1. If the answer is NO, it moves to step S4.

In step S4, it is determined whether or not the brake fluid temperature t when the amount of air in the circuit is measured is greater than the air amount excessiveness determination operating condition Th of the nonvolatile memory. If the answer is NO, it moves to step S10. On the other hand, if the answer is YES, it moves to step S5. Th is set at a brake fluid temperature that is less likely to normally develop, e.g. 70° C.

In step S5, it is determined whether or not the measured air amount v is smaller than the air amount excessiveness determination erasing permission set value V2. If negative determination is made, it moves to step S10. On the other hand, if affirmative determination is made, it moves to step S6.

In step S6, the air amount excessiveness judgement stored in the nonvolatile memory is erased. Due to this step, even if air amount excessiveness judgement has been made in the past, if it returns from a potentially dangerous state to a safe state due to natural release of air from the brake hydraulic circuit by e.g. brake actuation, an alarm may be aborted. If the air amount excessiveness determination erasing permission set value V2 of the nonvolatile memory is set smaller than the air amount excessiveness determination set value V1 to provide hysteresis, this is preferable because repeated storing and erasing of data into and from the nonvolatile memory due to variation of measurement can be eliminated.

If affirmative determination is made in step S3, it moves to step S7, and in step S7, an air amount excessiveness flag is established. It then moves to step S8.

In step S8, determination is made on whether the brake fluid temperature t when the air amount is measured is greater than the air amount excessiveness determination operating condition Th. If negative determination is made, it moves to step S10. On the other hand, if affirmative determination is made, it moves to step S9, where the air amount excessiveness determination this time is stored in the non-volatile memory, and it moves to step S10. Due to this process, if there is a potential danger that while the temperature is low in the travel this time, so that no air amount excessiveness determination has been made, but if air expands at high temperature, a sufficient braking force may not be produced, it is possible to produce an alarm to the driver using the air amount excessiveness determination results in the past.

In step S10, if an air amount excessiveness flag is established this time, or if air amount excessiveness determination is stored in the nonvolatile memory, it moves to step S11, and otherwise, it moves to step S1, so that no alarm is produced. In step S11, after giving an alarm to the driver, it moves to step S1.

Next, the function of the second embodiment will be described by use of the flowchart of FIG. 4. The mixed air amount alarm device of the second embodiment, too, has a nonvolatile memory, a fluid temperature meter for measuring the temperature of the brake fluid or a means for measuring the temperature sufficient to infer the brake fluid temperature, and a program for inferring the brake fluid temperature based on data from the measuring means. Like the first embodiment, the mixed air amount alarm device of the second embodiment also start activating simultaneously when the ignition switch is turned on, and the process according to the flowchart is executed at predetermined time intervals.

Steps S1–S3 are the same as in the first embodiment.

If affirmative determination is made in step S3 that the air amount v measured is greater than the air amount excessiveness determination set value (reference value) V1, it moves to step S10. In step S10, an air amount excessiveness flag is established, and it moves to step S11.

In step S11, after storing the air amount excessiveness determination and the brake fluid temperature Tm this time in the nonvolatile memory, it moves to step S12.

If negative determination is made in step S3 for the relation v≧V1, it moves to step S4. In S4, determination is made on whether the brake fluid temperature t when the air amount is measured is greater than the brake fluid temperature Tm stored in the nonvolatile memory. At this time, the brake fluid temperature t has to be compared with all of the brake fluid temperatures Tm stored. Or, in storing in the nonvolatile memory in step S11, conditions may be added that only if the fluid temperature Tm to be stored newly is greater than the brake fluid temperature Tm already stored, it is stored. If negative determination is made in step S4, it moves to step S12. If affirmative determination is made, it moves to step S5. In step S5, determination is made on whether the measured air amount v is smaller than the air amount excessiveness determination erasing permission set value V2. If negative determination is made, it moves to step S12. On the other hand, if affirmative determination is made, it moves to step S6.

Step s6 is a counter. It counts the number of times of determination that brake fluid temperature t is equal to or greater than the brake fluid temperature Tm stored in the nonvolatile memory, and the air amount v is equal to or less than V2. Determination is made in step S7 on whether this number of times is greater than a reference number of times C. If negative determination is made, it moves to step S12. If affirmative determination is made, the next step S8 is provided for the same purpose as step S6 of the first embodiment. The steps in S6 and S7 are to further eliminate the influence of measurement variation, which was worried in the first embodiment, too. Next, in step S9, the resetting of the counter is carried out, and it moves to step S12.

Steps S12 and S13 carry out the same treatment as in steps S10 and S11 of the first embodiment.

With the treatment based on these flows, it is possible to eliminate differences in alarms resulting from temperature change, and further, it is possible to abort an alarm if the a safety state is recovered due to spontaneous release of air.

As described above, according to the mixed air amount alarm device of this invention, the following functions and effects are achieved.

That is, if determination of air amount excessiveness is established, it is stored in the nonvolatile memory so that the contents of the nonvolatile memory can be checked when it is activated next time. Thus, if air amount excessiveness determination has been made before, it is possible to produce an alarm to the driver even if air amount excessiveness determination is not established due to reduced air volume due to reduced temperature.

Also, if determination of air amount permissible level is made under predetermined conditions, the air amount excessiveness determination history stored in the nonvolatile memory is erased, so that if a safe state is recovered by e.g. spontaneous release of air out of the hydraulic circuit, it is possible to stop an alarm.

Thus, no discrepancy between alarm and non-alarm will be produced at each activation due to the influence of temperature changes, so that it is possible to reliably produce an alarm even if there is a potential danger at high temperature. This improves reliability.

What is claimed is:

1. A mixed air amount alarm device used in a hydraulic circuit of a hydraulic device for determining the amount of air mixed in a hydraulic circuit between a hydraulic pressure source and an instrument driven by hydraulic pressure and producing an alarm if the air amount is determined excessive, said device comprising a nonvolatile memory, wherein if the air amount is determined excessive, this is stored in said nonvolatile memory, and the content of said nonvolatile memory is checked at subsequent activation of the hydraulic device, even if determination of air amount excessiveness is not made and an alarm is produced if determination of air amount excessiveness has been made before.

2. A mixed air amount alarm device as claimed in claim 1, further comprising a fluid temperature meter for measuring the temperature of hydraulic fluid, or means for measuring the temperature of a portion suitable to infer the temperature of the hydraulic fluid, and a program for inferring the temperature of the hydraulic fluid from tile temperature measured by said temperature measuring means, wherein only if the air amount is determined excessive in a high temperature state in which the temperature of the hydraulic fluid or the inferred temperature is equal to or higher than a predetermined value, storage in said nonvolatile memory is carried out.

3. A vehicle hydraulic brake control device comprising a mixed air amount alarm device as claimed in claim 2.

4. A mixed air amount alarm device as claimed in claim 1, further comprising a fluid temperature meter for measuring the temperature of hydraulic fluid, or means for measuring the temperature of a portion suitable to infer the temperature of the hydraulic fluid, and a program for inferring the temperature of the hydraulic fluid from the temperature measured by said temperature measuring means, wherein if the air amount is determined to be at a permissible level in a high temperature state in which the temperature of the hydraulic fluid or the inferred temperature is equal to or higher than a predetermined value, air amount excessiveness determination history in said nonvolatile memory is erased.

5. A mixed air amount alarm device as claimed in claim 4 wherein a reference air amount for determining an air amount permissible level is smaller than a reference air amount for determining air amount excessiveness.

6. A vehicle hydraulic brake control device comprising a mixed air amount alarm device as claimed in claim 5.

7. A mixed air amount alarm device as claimed in claim 4 wherein after carrying out the determination of air amount permissible level at least several times, said nonvolatile memory is erased.

8. A vehicle hydraulic brake control device comprising a mixed air amount alarm device as claimed in claim 7.

9. A vehicle hydraulic brake control device comprising a mixed air amount alarm device as claimed in claim 4.

10. A mixed air amount alarm device as claimed in claim 1, further comprising a fluid temperature meter for measuring the temperature of hydraulic fluid, or means for measuring the temperature of a portion suitable to infer the temperature of the hydraulic fluid, and a program for inferring the temperature of the hydraulic fluid from the temperature measured by said temperature measuring means, wherein the fluid temperature of the hydraulic fluid or the inferred value of the fluid temperature when air amount excessiveness determination is made, too, are stored in said nonvolatile memory, and if the air amount is determined to be at a permissible level at subsequent activation of the hydraulic device with the fluid temperature or its inferred value at the time of activation being higher than the temperature of the hydraulic fluid or the inferred value of the fluid temperature when the previous air amount excessiveness determination is made, the air amount excessiveness determination history and the stored fluid temperature or inferred fluid temperature in said nonvolatile memory are erased.

11. A mixed air amount alarm device as claimed in claim 10 wherein a reference air amount for determining an air amount permissible level is smaller than a reference air amount for determining air amount excessiveness.

12. A vehicle hydraulic brake control device comprising a mixed air amount alarm device as claimed in claim 11.

13. A mixed air amount alarm device as claimed in claim 10 wherein after carrying out the determination of air amount permissible level at least several times, said nonvolatile memory is erased.

14. A vehicle hydraulic brake control device comprising a mixed air amount alarm device as claimed in claim 13.

15. A vehicle hydraulic brake control device comprising a mixed air amount alarm device as claimed in claim 10.

16. A vehicle hydraulic brake control device comprising a mixed air amount alarm device as claimed in claim 1.

* * * * *